Dec. 5, 1967  D. J. DADDONA, JR  3,355,780
SNAP FASTENER ASSEMBLIES
Filed Jan. 7, 1966

3,355,780
SNAP FASTENER ASSEMBLIES
Domenic J. Daddona, Jr., Waterbury, Conn., assignor to Scovill Manufacturing Company, Waterbury, Conn., a corporation of Connecticut
Filed Jan. 7, 1966, Ser. No. 519,358
3 Claims. (Cl. 24—208)

ABSTRACT OF THE DISCLOSURE

An all plastic snap fastener assembly has a solid post on one part shaped to cooperate with a hole in another part so that the leading end of the post will blank out a piece of fabric to form the hole. The post has a follow-up portion of a slightly larger diameter, shaped to provide a sharply cornered step which acts to shear the fabric threads that have been pulled into the hole by the leading end of the post.

---

This invention relates to snap fastener assemblies where all parts of the fastener are of plastic material.

The invention more specifically, deals with a novel construction of the fastener member and the attaching element so that it will be self-piercing when applied to a fabric support.

In the patent to Huelster et al. 3,107,408, we find an assembly with a self-piercing element for a plastic snap fastener which is suitable for the lighter applications where the fasteners are small and the pulling action required to separate a fastener is not great. In the case of fasteners for heavier applications, the central post must be substantially larger, not only for tensile strength, but also for rigidity; and in the case of these heavier duty fasteners, the Huelster construction will not suffice. Furthermore, with an ordinary cylindrical solid post working in co-operation with the hole of slightly smaller diameter, clean piercing of a hole in the fabric support is not obtainable, with the result that the partially cut-off patch will not fall away.

The object of my invention, therefore, is to provide an improved combination involving a novel post construction which will pierce out the hole in the supporting material cleanly and allow the punched-out piece to fall away.

In the accompanying drawing, I have shown for purpose of illustration, one embodiment which the invention may assume in practice. In the drawing.

Figure 1:
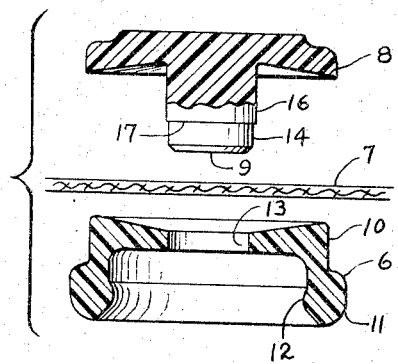
FIG. 1 is a central section through the fastener parts ready to be applied to the supporting material.
Figure 2:
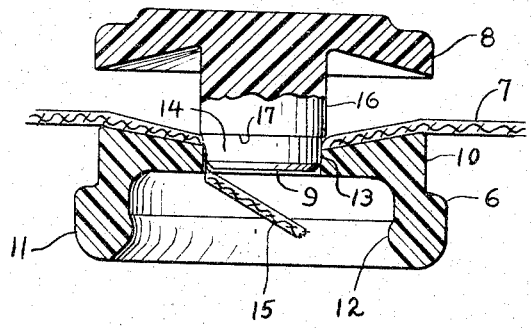
FIG. 2 illustrates the piercing of the hole on a slightly larger scale.
Figure 3:
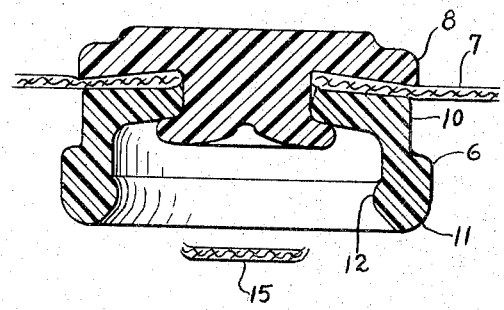
FIG. 3 shows the completed assembly.

In the fastener of FIGS. 1, 2 and 3, the socket element 6 of plastic material is attached to the fabric support 7 by an attaching member also of thermoplastic material. This attaching member has a head 8 adapted to bear against one face of the material 7 and a solid post 9 integral with the base and projecting centrally from it.

The socket member has a base 10 opposed to the head 8 and adapted to bear against the opposite side of the material 7. The socket member has a flange 11 shaped with an inner ridge 12 so as to co-operate with a stud in the same fashion as described in the above-mentioned Huelster patent.

The socket member also has a central hole 13 and the solid post 9 has a leading end portion 14 of slightly larger diameter than the hole 13. Preferably, this difference in diameter is about .004–.008" so that when it is pushed into the hole 13, it will at least partially shear away a piece of the fabric support 7, the sheared piece being indicated by the numeral 15.

The remaining portion of the post 9 between the leading end 14 and the base 8, herein designated 16, is of slightly larger diameter than the leading end portion, preferably about .004" larger.

It is also shaped to provide a sharply cornered step 17 between the two diameters so that when the post is pushed further into the hole 13, this step or shoulder will complete the shearing away of the piece 15 to make a clean-cut hole in the fabric so that the piece 15 will drop away.

Figure 4:
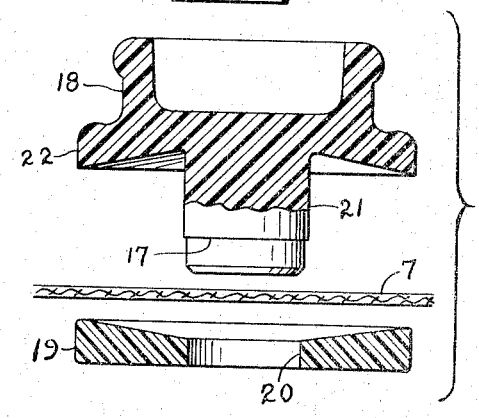
FIG. 4 is a modified arrangement embodying the same invention.

As seen in FIGURE 4, the same principle is applied to the attachment of a stud element 18 by means of an attaching member 19 in the form of a ring with a central hole 20. The solid post 21 extends from the base 22 of the stud member and is of the same shape as the post 9 and with diameters of the same relative size with respect to the hole 20 in the attaching ring 19.

The assembly of either the socket or stud is completed in the manner seen in FIG. 3 by upsetting the end of the post 9 to lock the parts in place.

What I claim is:

1. A fastener element assembly comprising a fabric support, a fastener member of thermoplastic material having a base, adapted to bear against one side of said fabric support, an attaching member of thermoplastic material adapted to bear against the other side of said support, one of said members having a centrally arranged hole therethrough, and a solid post integral with and projecting from the central portion of the other of said members, said post having a leading end portion with a diameter only slightly larger than the diameter of said hole whereby it will at least partially shear out a piece from the interposed fabric support as the post is forced into said hole, the remaining portion of said post having a slightly larger diameter than said leading end portion and shaped to provide a sharply cornered step between said portions which acts to complete the shearing of said piece of supporting material as said post is forced further into said hole.

2. An assembly as defined in claim 1, wherein the leading end portion of the solid post has a diameter which exceeds the diameter of said hole by an amount greater than .003" and less than .010".

3. An assembly as defined in claim 1, wherein the difference in diameter between the leading end portion of said post and the adjacent portion thereof is of the order of .004" providing for a step of about .002".

References Cited

UNITED STATES PATENTS

| 347,887 | 8/1886 | Pringle | 24—218 |
| 1,319,659 | 10/1919 | Simek | 24—218 |

OTHELL M. SIMPSON, *Primary Examiner.*

WILLIAM FELDMAN, *Examiner.*

E. SIMONSEN, *Assistant Examiner.*